July 6, 1954
R. D. MERRILL
2,682,699
ABRADANT TOOL MOUNT
Filed Aug. 8, 1952
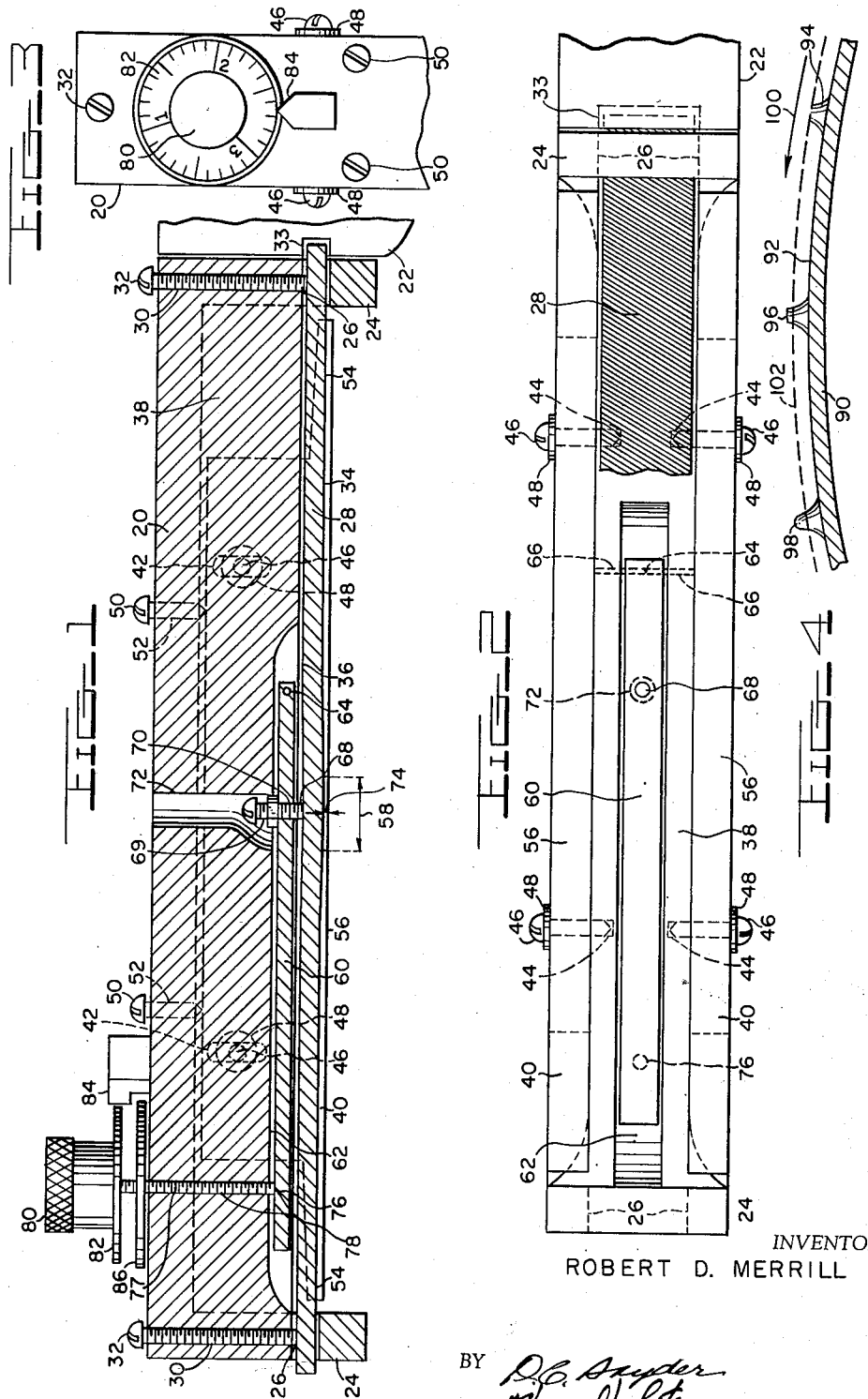
INVENTOR
ROBERT D. MERRILL
ATTORNEYS Patented July 6, 1954

2,682,699

UNITED STATES PATENT OFFICE 2,682,699

ABRADANT TOOL MOUNT

Robert D. Merrill, Rome, N. Y.

Application August 8, 1952, Serial No. 303,454

9 Claims. (Cl. 29—80)

(Granted under Title 35, U. S. Code (1952), sec. 266)

This invention relates generally to an abradant tool mount and more particularly to a mount for accurately and selectively spacing the working surface of an abradant tool a predetermined distance from a workpiece.

In certain industrial applications it is necessary to provide a workpiece member with a particular facing, the facing consisting of a plurality of small protuberances projecting outwards from a general surface, as for example a cylindrical surface. An additional requisite in manufacturing the member is that the tops of all the protuberances must be uniformly and extremely accurately displaced away from the general surface. Such uniform and accurate displacement is usually achieved by smoothing down roughly formed protuberances on the workpiece with an abrading tool such as a bowed mill file in a file mount. Such abradant tool mounts as are familiar to the prior art however are unsatisfactory for the purpose contemplated since they incorporate no means for spacing the working abradant surface of the tool a fixed distance from the general surface of the workpiece so that the protuberance tops will be uniformly finished off to the same height from the surface. Furthermore the prior art is unacquainted with a means for adjusting the bow of the file to the high degree of accuracy necessary for the purpose of selectively fixing, within the limits of tolerance required, the amount by which the protuberances will be filed down. In addition, the abradant tool mounts familiar to the prior art are usually large in size relative to the size of the tool itself, the prior art file mounts thereby being cumbersome and unadaptable to abrading operations in a limited space.

It is therefore an object of this invention to provide an abradant tool mount arrangement whereby the working surface of a bowed abradant tool may be spaced a selected predetermined distance from a workpiece.

It is a further object of this invention to provide an abradant tool mount arrangement whereby the fixed spacing between the working surface of a bowed abrading tool and the general surface of a workpiece may be adjusted with an extremely high degree of accuracy.

It is a further object of this invention to provide an abradant tool mount arrangement, compact and convenient in structure.

Other and further objects and features of the present invention will become apparent upon a careful consideration of the following description when taken together with the accompanying drawings which illustrate typical features of the invention and the manner in which the invention may be considered to operate.

In the drawings:

Figure 1 represents a side elevation in cross section along the longitudinal center line of one illustrative embodiment of the present invention;

Figure 2 represents a bottom view of the embodiment of Figure 1 with a portion of the abradant tool broken away to illustrate the structure lying inwards of the tool;

Figure 3 represents a partial plan view of the embodiment of Figure 1;

Figure 4 represents a side elevation in cross section of one kind of workpiece particularly adaptable to be finished off by the abradant tool mount arrangement of the present invention.

Briefly the objects of invention set forth above are achieved by providing an arrangement comprising a frame, a means for clamping an abradant tool to the frame, a means for bowing with extreme accuracy the central portion of the abradant tool and a pair of guide pieces affixed to the frame in flank relation to and below the abradant tool. With respect to the bowing of the file, the means for accomplishing the same consists of a lever arm hinged at one end by a pivot to the under side of the frame, the lever arm lying substantially parallel to the tool and opposite the inner surface of the same. The free end of the lever arm is movable towards or from the tool. For coarse bow adjustment, a first adjustably extensible stud projects outwards from median portion of the lever arm to bear against the central portion of the abradant tool. For fine bow adjustment a second stud, adjustably extensible from the frame, positions the free end of the lever arm, thereby permitting a slight and accurately controlled shifting of the first stud position.

With respect to the function of the guide pieces, each guide piece has an outer surficial portion which may be brought to bear against the general surface of the workpiece thereby spacing the working surface of the abradant tool a predetermined distance from the workpiece general surface. As a result all of the protuberances of the workpiece will be finished off to a uniform height.

By virtue of the arrangement just described a highly compact and convenient abradant tool mount is obtained.

Referring now to Figure 1 the figure represents a side elevation of the tool mount taken in cross section on the longitudinal center line of the tool. In Figure 1 the numeral 20 designates a longitudinally extending frame constituted of steel or other suitable material and having top, bottom and lateral faces. Frame 20 is joined to a handle 22 by a suitable means (not shown). At each end of frame 20 a crossblock 24 extends transversely across the frame bottom face. Crossblocks 24 may be affixed to frame 20 by a suitable means (not shown) or may be constructed as an integral part of the frame. The central portion of the upper surface of each crossblock 24 is longitudinally notched with the result that crossblocks 24 and the associated ends of frame 20 cooperate together to form two enclosed slots 26 for retaining an abradant tool 28. At the slot locations the threaded holes 30 containing clamping screws 32 extend downwardly through the frame to communicate with the upper slot surfaces. When frame 20 and abradant tool 28 are assembled together, the two ends of tool 28 are clamped tightly to the frame by the expedient of tightening clamping screws 32 until they force the ends of tool 28 tightly against crossblocks 24. In such clamped position one end of the tool 28 is recessed in a notch 33 of the handle 22.

The abradant tool 28 is of elongated, longitudinally extending shape and has an abrading surface 34 facing outwards of the frame and an inner surface 36 confronting the frame bottom face. The tool 28 is resilient in nature so that it may be bowed in a direction normal to its longitudinal extension. While abradant tool 28 is typically a blunt mill file, files of other configurations and abradant tools other than files, but having the characteristics described, may be utilized in accordance with the configuration and finish desired for the workpiece to which the present device is to be applied.

The structure of frame 20 can be described by saying that medially of the frame ends, portions of the lateral and bottom faces are cut away to leave a rib 38 (best shown in Figure 2) forming a pair of L-shaped channels in back to back relation. Therefore, the end portions of the frame have a square transverse cross section and the median portions of the frame have a T-shaped transverse cross section. The transverse distance across the bottom face of the rib is slightly greater than the width of abradant tool 28.

Considering further the structure of the tool mount, to each side of the rib 38 there is fastened a guide piece 40 extending downwardly and outwardly from the frame a certain distance beyond the abradant surface 34 of tool 28, the guide pieces thereby being disposed in flank relation to the tool. As to the means of affixation of guide pieces 40 to rib 38, each guide piece is pierced by two spaced apart slots 42 extending for a limited distance in the vertical direction. The rib 38, itself, has on each side two inwardly extending threaded holes 44 (shown in Figure 2) which, when guide pieces 40 are properly positioned, will register with the slots in the guide pieces. For affixation, four fastening screws 46 may be led through washers 48, the slots 42 and into the threaded holes 44. By a rotation giving an inward movement, fastening screws 46 may be tightened to the extent where they will clamp the guide pieces 40 against sides of rib 38. By virtue of slots 42 the guide pieces 40 are free to move for a limited distance with respect to the plane of the bottom or under face of the frame. The distance of the guide pieces from the frame under side may be fixed by four spacing screws 50, a pair of which extend downwardly through separate recessed holes 52 in the frame to bear against the upper surface of each guide piece.

While in the embodiment shown in Figure 1 the guide pieces 40 are independently adjustable in position with respect to frame 20, it is, of course, feasible to make the guide pieces 40 simultaneously adjustable. In an arrangement of the latter sort the guide pieces are fixed in position relative to each other by straps (not shown) running between oppositely spaced prongs 54 of the two guide pieces to rigidly connect each prong 54 with its opposite prong.

Each guide piece 40 is characterized by a surficial portion 56 located downwards and farthest outwards of the under side of frame 20, which two surficial portions cooperate together to space the working surface of abradant tool 28 a predetermined distance from the general surface of a workpiece. In the embodiment of Figure 1, for each guide piece 40 the outer surficial portion 56 takes the form of a flat, plane defining facing on the under side of the guide piece. Of course, depending upon the nature of the workpiece the outer surficial spacing portions 56 of the guide pieces 40 may advantageously take other forms such as cylindrical defining surfaces, knife edges or four projections, two for each guide piece.

As mentioned heretofore a purpose of the disclosed abradant tool mount arrangement is to permit finishing of the tops of small protuberances projecting above a general surface to a required height distance with a high degree of accuracy. Since in practice, an abradant tool 28 with a completely fair abrading surface 34 cannot ordinarily be obtained, it is necessary to bow abradant tool 28 outwards from frame 20 so that only the central portion 58 of abradant surface 34 will be a working abrading surface. By so limiting the working region of the abrading surface, inaccuracies in finishing off the workpiece protuberances are eliminated, for the reason that only a small region of the abradant surface contacts the protuberance and that for this small region any irregularities in the abradant surface are negligible.

In order to bow the abradant tool 28 outwards at its central portion the present arrangement provides for a lever arm 60 recessed in a longitudinally extending slot 62 in the bottom or under face of the rib 38. The lever arm 60 is maintained in hinged relation with respect to the frame 20 by a pivot pin 64 which passes transversely through one end of the lever arm, the extremities of pin 64 being supported in transverse holes 66 extending from the sides of slot 62 towards the exterior of rib 38. By such pivoting arrangement lever arm 60 is constrained to move towards or from the inner surface 36 of tool 28. At a median portion of the lever arm 60, the portion being displaced from the pivoted end of the arm but having a low relative travel for a given angular displacement of the free end of the lever, an adjustably extensible stud 68 projects outwardly from the lever to bear against the central portion of inner surface 36 for introducing an outward bow to tool 28. In the embodiment of Figure 1 the stud 68 is the bottom part of a screw 69 passing through a threaded hole 70 in the lever arm 60. The extension of stud 68 outwards from the lever arm 60 may be adjusted by a screwdriver which for adjustment is inserted into a hole 72 extending downwardly through the frame 20. Adjustment of stud 68 permits a coarse adjustment in the bow position of the tool 28.

For fine adjustment of the tool bow position and thus of the height file distance as represented by arrows 74, a second adjustably extensible stud 76 projects outwardly from frame 20 to bear against the free end of the lever arm 60 and to thereby position the arm with respect to its angular displacement about its pivot 64. In the embodiment of Figure 1 the stud 76 is the bottom part of a screw 77 which passes from above the top face of the frame and downwardly through a threaded hole 78 positioned opposite the lever arm free end. The rotation of the screw 77 in one direction or the other will cause up or down movement of the lever arm free end. The resilience of abradant tool 28 will hold the lever arm in engagement with stud 76 as long as some bowing is introduced to the tool. By shifting the position of the lever arm free end the position of stud 68 will be correspondingly shifted up or down but to a much lesser extent. Since the position of stud 68 determines the amount of bow of abradant tool 28, it is seen that by varying the extension of stud 76 a fine adjustment in the bow position of tool 28 is possible.

In order to facilitate fine adjustment for the disclosed abradant tool mount, screw 77, at its upper extremity, is provided with a micrometer arrangement for controlling the rotation of the screw. The micrometer device consists of a knurled knob 80 and a micrometer dial 82 both rigidly attached to and in coaxial relation with the body of screw 77. The angular position of screw 77 may be determined by a series of numbered calibrations inscribed around the periphery of the micrometer dial 82 and successively registering in rotation with a pointer member 84 affixed by suitable means not shown to the top face of frame 20. When the desired setting of screw 77 has been obtained, the screw 77 may be locked in this position by a lock nut 86 freely rotatable about screw 77 to bear, when locking, against the top face of frame 20.

Figure 2 shows more of the details of the arrangement of the lever arm 60 and the guide pieces 40. Figure 3 shows more of the details of the micrometric control for screw 77, particularly the relationship between the calibrations on the micrometer dial 82 and the pointer member 84.

The embodiment of Figure 1 may be operated in the following manner. Initially consider that abradant tool 28 is not assembled with frame 20, that clamping screws 32, spacing screws 50 and studs 68 are withdrawn to an extent where they do not project out of their threaded holes, that stud 76 is adjusted to a median position of extension and that further the fastening screws 46 are loosened to allow play between the rib 38 and the guide pieces 40. First, abradant tool is slipped through slots 26 until it comes to rest in notch 33 of handle 22. Clamping screws 32 are next turned to fasten tool 28 tightly to frame 20. The assembly is then laid with guide pieces 40 facing downwards onto a true plane surface of smaller longitudinal extent than the distance between crossblocks 24, and a shim of thickness slightly greater than the height file distance desired is placed under the central portion of abrading tool 28.

Since play exists between the guide pieces 40 and the rib 38 the guide pieces will now drop down until their outer surficial portions 56 are at a level below that of the abradent surface 34, the portions 56 bearing against the true plane surface. The spacing screws 50 are now turned inwardly until they bear lightly against the guide pieces. At this point the outer surficial portions of the guide pieces are fixed by the spacing screws to define a true plane. Since this condition is the one desired, the guide pieces 40 are now clamped tightly to the rib 38 by tightening of the fastening screws 46.

To produce the necessary bow position for abradant tool 28, stud 68 is extended outwards from the lever arm by rotation of screw 69 until it is estimated that a bow position which will give the required height file distance 74 has been reached. This obtained bow position is then checked against the required height file distance by finishing off a sample workpiece protuberance with the initial bow setting and measuring the height of the finished sample protuberance with a gauge. The gauge measurement will indicate whether more coarse adjustment by turning of the stud 68 is desirable. The adjustment is made and the sampling is repeated. Upon approaching closely by trial and error the required height file distance, the fine adjustment screw 77 with its micrometric control is utilized to shift the bow position of the abradant tool. When the exact height file distance has been achieved, the screw 77 may be fixed against further rotation by tightening of the lock nut 86. Of course if a subsequent application requires a radical change in height file distance, the spacing of the outer surficial portions of the guide pieces from the frame may be readjusted as described above.

Figure 4 demonstrates the mode of operation of the presently disclosed arrangement after it has been adjusted to the proper height file distance. The numeral 90 designates the workpiece to be finished and the numeral 92 designates the general surface of this workpiece which, in the present instance, is cylindrical in configuration. The numerals 94, 96 and 98 designate small protuberances projecting above the reference surface 92 which protuberances, respectively, have been completely finished, partially finished and remain unfinished. As shown by the arrow 100, the abradant tool and mount are moved back and forth in a filing motion in the direction of curvature of the workpiece with the longitudinal axis of the abradant tool being aligned with the direction of curvature. In conducting the finishing operation the two guide pieces of the tool mount straddle the protuberances shown in Figure 4 and the device is operated in a manner so that the outer surficial portions 56 of the guide pieces 40 always rest against the general surface 92 of the workpiece. By so employing the presently disclosed device it will be recognized that all of the protuberances treated will be finished off to a uniform height with a high degree of accuracy, the tops of the protuberances defining a cylindrical surface concentric with the general surface as shown by dotted line 102.

It is seen therefore that the present invention represents an abradant tool mount characterized by the fact that the working surface of an abradant tool assembled therewith may be selectively spaced a predetermined distance from the general surface of a workpiece to be finished, and that furthermore the spacing of the working abradant surface from the general workpiece surface may be controlled with a high degree of accuracy. In addition, the present invention represents a compact and convenient structure for an abradant tool mount. While the operation of the present invention has been illustrated in conjunction with a particular type of workpiece having protuberances projecting above a cylindrical surface, it will be obvious to those familiar with the art that the present invention is adaptable to finishing off any workpiece having protuberances projecting above a general surface of regular configuration. In addition, it will be obvious to those familiar with the art that, by bowing the abradant tool outwards of the guide piece surficial portions, the present invention is adaptable to applications where it is desired to create concavities in a workpiece with respect to a general surface. Thus the present invention is capable of being profitably employed in a variety of useful applications.

Although a single embodiment of this invention has been herein disclosed and described it is to be understood that it is merely illustrative of this invention and various modifications, of course, may be made without departing from the spirit and scope of the invention as defined in the appended claims.

The invention described herein may be manufactured and used by or for the Government of the United States of America for governmental purposes without the payment of any royalties thereon or therefor.

What is claimed is:

1. An abradant tool mount comprising, a frame adapted to maintain an elongated resilient abradant tool in outwardly bowed position with its abradant surface facing outwards from said frame, and a pair of guide pieces affixed to said frame in flank relation to said tool and having respectively, outward facing surficial portions conjointly effectual to space a median portion of the outwardly bowed tool a predetermined distance from a workpiece.

2. The device as in claim 1 further characterized by means for selectively varying the mentioned predetermined distance.

3. An abradant tool mount comprising an elongated frame, means at the frame ends for clamping the two ends of a resilient elongated tool having an abradant surface to said frame, said surface facing outwardly thereof, means for positioning said tool in an outwardly bowed configuration, and a pair of guide pieces affixed to said frame in flank relation to said tool and each having outward facing surficial portions conjointly effectual to space a median portion of the outwardly bowed tool a predetermined distance from a workpiece.

4. The device as in claim 3 further characterized by means for selectively varying the mentioned predetermined distance.

5. An abradant tool mount comprising an elongated frame, means at the frame ends for clamping the two ends of a resilient elongated tool having an abradant surface to said frame, said surface facing outwards from said frame, first bow adjustment means extensible to bear against a median portion of said tool for bowing selectively said abradant surface outwards from said frame, and second bow adjustment means mechanically coupled to said first bow adjustment means to provide a vernier adjustment for said selective bowing.

6. An abradant tool mount comprising an elongated frame having an under side, means at the frame ends for clamping the two ends of a resilient elongated tool to said frame opposite the under side thereof, said tool having an inner surface and an outer abradant surface, facing toward and away from said under side respectively, a tool inner surface confronting lever arm having a first end hinged to said frame under side and a second free end movable towards or from said tool, a first stud outwardly extensive from a median portion of said lever arm and against an inner surface median portion of said tool to position said tool in bow configuration, and a second lever arm positioning stud adjustably extensible outward from said frame under side to bear against said lever arm free end.

7. An abradant tool mount comprising an elongated frame having an under side, means at the frame ends for clamping the two ends of a resilient elongated tool to said frame opposite the under side thereof, said tool having an inner surface and an outer abradant surface facing towards and away from said under side respectively, a tool inner surface confronting lever arm having a first end hinged to said frame under side and a second free end movable towards and from said tool, a first tool bowing stud adjustably extensible outwards from a median portion of said lever arm and against an inner surface median portion of said tool, and a second lever arm positioning stud adjustably extensible outwards from said frame under side to bear against said lever arm free end.

8. An abradant tool mount comprising an elongated frame having an under side, means at the frame ends for clamping the two ends of a resilient elongated tool to said frame opposite the under side thereof, said tool having an inner surface and an outer abradant surface facing towards and away from said under side respectively, a tool inner surface confronting lever arm having a first end hinged to said frame under side and a second free end movable towards and from said tool, a first tool bowing stud adjustably extensible outwards from a median portion of said lever arm and against an inner surface median portion of said tool, a second lever arm positioning stud adjustably extensible outwards from said frame under side to bear against said lever arm free end, and a pair of guide pieces affixed to said frame in flank relation to said tool and having respectively, outward facing surficial portions conjointly effectual to space the median portion of the outwardly bowed tool a predetermined distance from a workpiece.

9. An abradant tool mount comprising an elongated frame having an under side, means at the frame ends for clamping the two ends of a resilient elongated tool to said frame opposite the under side thereof, said tool having an inner surface and an outer abradant surface facing toward and away from said under side respectively, a tool inner surface confronting lever arm having a first end hinged to said frame under side and a free end movable towards or from said tool, a first stud outwardly extensive from a median portion of said lever arm and against an inner surface median portion of said tool to position the same in bow configuration, a second lever arm positioning stud adjustably extensible outward from said frame under side to bear against said lever arm free end, and a pair of guide pieces affixed to said frame in flank relation to said tool and having respectively outward facing surficial portions conjointly effectual to space the median portion of the outwardly bowed tool a predetermined distance from a workpiece.

References Cited in the file of this patent

UNITED STATES PATENTS

| Number | Name | Date |
| --- | --- | --- |
| 1,618,604 | Riggs | Feb. 22, 1927 |
| 1,956,882 | Stowell | May 1, 1934 |
| 2,127,176 | Kroecker | Aug. 16, 1938 |